United States Patent
Bertram et al.

(10) Patent No.: US 12,054,577 B2
(45) Date of Patent: Aug. 6, 2024

(54) BIO-RENEWABLE POLYURETHANE FOAM FOR CONSUMER CLEANING APPLICATIONS

(71) Applicant: INOAC USA, INC., Troy, MI (US)

(72) Inventors: Raymond Bertram, Moonachie, NJ (US); Khalil N. Khameneh, Moonachie, NJ (US); William D. Keefe, Jr., Moonachie, NJ (US)

(73) Assignee: INOAC USA, Inc., Troy, MI (US)

( * ) Notice: Subject to any disclaimer, the term of this patent is extended or adjusted under 35 U.S.C. 154(b) by 143 days.

(21) Appl. No.: 17/408,611

(22) Filed: Aug. 23, 2021

(65) Prior Publication Data

US 2022/0056191 A1    Feb. 24, 2022

Related U.S. Application Data

(60) Provisional application No. 63/069,204, filed on Aug. 24, 2020.

(51) Int. Cl.
| | |
|---|---|
| C08G 18/08 | (2006.01) |
| C08G 18/10 | (2006.01) |
| C08G 18/32 | (2006.01) |
| C08G 18/36 | (2006.01) |
| C08G 18/42 | (2006.01) |
| C08G 18/76 | (2006.01) |
| C08G 101/00 | (2006.01) |

(52) U.S. Cl.
CPC ............. *C08G 18/14* (2013.01); *C08G 18/10* (2013.01); *C08G 18/3221* (2013.01); *C08G 2101/00* (2013.01); *C08G 2110/0041* (2021.01)

(58) Field of Classification Search
None
See application file for complete search history.

(56) References Cited

U.S. PATENT DOCUMENTS

| | | | |
|---|---|---|---|
| 3,000,916 A | 9/1961 | Klass et al. | |
| 3,068,254 A | 12/1962 | Le Bras et al. | |
| 8,133,930 B2* | 3/2012 | Wiltz, Jr. | C08G 18/4018 521/131 |
| 2003/0083394 A1* | 5/2003 | Clatty | C08J 9/00 521/155 |
| 2003/0149214 A1* | 8/2003 | Westfechtel | C08G 18/4233 528/44 |
| 2007/0238798 A1 | 10/2007 | McDaniel et al. | |
| 2012/0302652 A1 | 11/2012 | Meyer et al. | |
| 2016/0009852 A1 | 1/2016 | Yu et al. | |

FOREIGN PATENT DOCUMENTS

WO    WO2015183070 A1    12/2015

OTHER PUBLICATIONS

EMEROX® Polyols—Product Line Overview, Emery Oleochemicals, Nov. 2019, pp. 1-2 (Year: 2019).*
Mora-Murillo; Luis Daniel, et al.; Thermal-Mechanical Characterization of Polyurethane Rigid Bio-Foams: Effect of Modifying Bio-Polyol Content in Isocyanate Prepolymers; Journal of Renewable Materials; Feb. 14, 2017 (11 pages).
Written Opinion & International Search Report for PCT/US2021/047228 dated Dec. 17, 2021 (8 pages).
PCT Notice—Third Party Observation for PCT/US2021/047228 dated Jul. 8, 2022 (3 pages).
Preliminary Report on Patentabiltiy for PCT/US2021/047228 dated Mar. 9, 2023 (5 pages).
Product Portfolio Overview; Eco-Friendly Polyols; Emery Oleochemicals; Aug. 2023 (2 pages).

* cited by examiner

*Primary Examiner* — Melissa A Rioja
(74) *Attorney, Agent, or Firm* — Reising Ethington P.C.

(57) ABSTRACT

Disclosed is a polyurethane foam and a method of preparing the same which utilizes only bio-renewable polyols and no petroleum derived polyols. The polyol is derived from a bio-renewable source and has a bio-renewable content of at least 70% by weight. The produced foams have mechanical and performance properties that are equal to or exceed those of similar polyurethane foams produced using petroleum derived polyols. The foams are preferably formed into sponges and other cleaning products for use by consumers and in industrial settings.

15 Claims, 1 Drawing Sheet

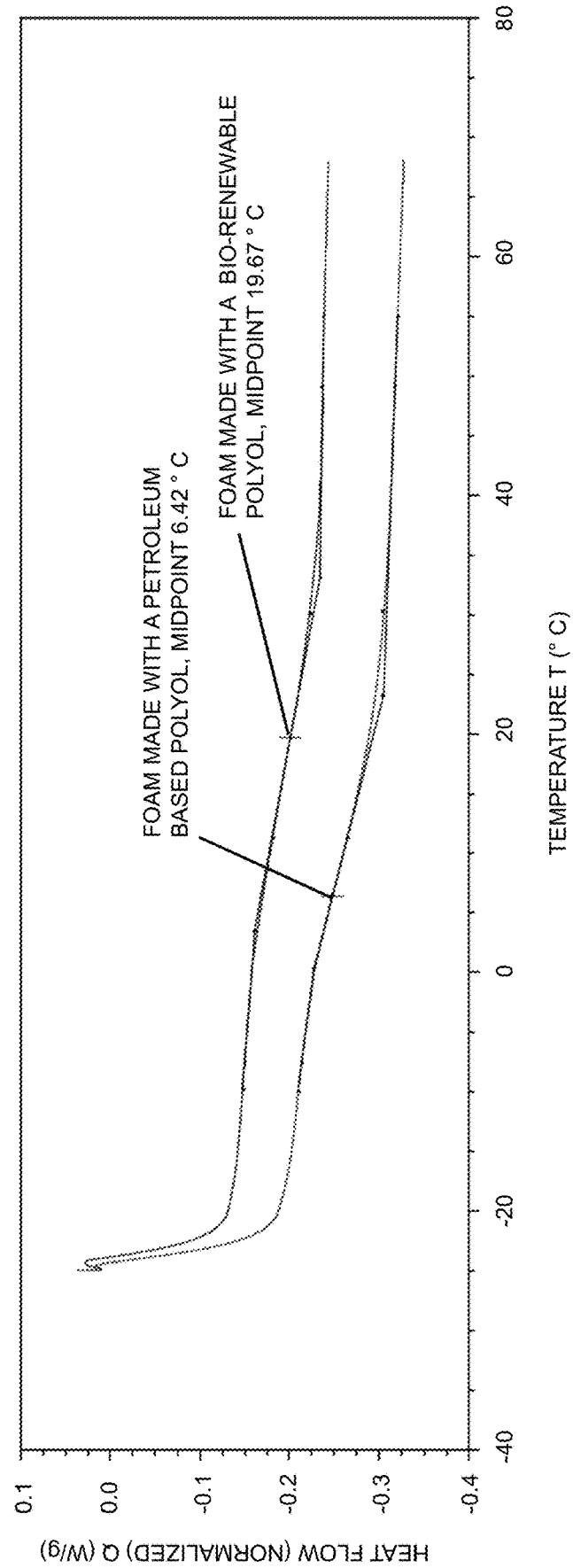

BIO-RENEWABLE POLYURETHANE FOAM FOR CONSUMER CLEANING APPLICATIONS

CROSS-REFERENCE TO RELATED APPLICATIONS

This application claims the benefit of U.S. Provisional Application No. 63/069,204 filed Aug. 24, 2020.

STATEMENT REGARDING FEDERALLY SPONSORED RESEARCH

None.

STATEMENT REGARDING JOINT DEVELOPMENT AGREEMENT

None.

REFERENCE TO SEQUENCING LISTING, TABLE OR COMPUTER PROGRAM LISTING

None.

STATEMENT REGARDING PRIOR DISCLOSURES BY THE INVENTOR OR A JOINT INVENTOR UNDER 33 C.F.R 1.77(B)(6)

None.

FIELD OF THE DISCLOSURE

This present disclosure relates generally to polyurethane foams, and more particularly to a polyurethane foam formed from bio-renewable components.

BACKGROUND OF THE DISCLOSURE

This section provides background information which is not necessarily prior art to the inventive concepts associated with the present disclosure.

Polyurethane foams are well known in the art. They generally comprise the reaction products of at least one polyisocyanate and at least one polyol. The polyisocyanate can generally comprise any polyisocyanate including: aromatic polyisocyanates such as diphenylmethane diisocyanate (MDI), polymeric MDI, and toluene diisocyanate (TDI); other polyisocyanates include a polyisocyanate pre-polymer, hydrogenated MDI, and naphthalene diisocyanate. The polyol is at least a diol, but can have additional —OH groups and its characteristics can determine the properties of the produced polyurethane foam. For example long flexible polyols produce softer more flexible foams while shorter more constrained polyols produce more rigid foams. Likewise polyols that can form cross linkages produce a more rigid foam.

Polyurethanes can be used to form a wide variety of items including textiles, bedding, furniture, insulation, adhesives, sealants and foam items. In the present specification the subject matter is a polyurethane foam and more specifically a foam used in consumer cleaning applications. Traditionally, both the polyisocyanates and the polyols have been derived from crude oils, which are non-renewable resources. Increasingly, consumers and manufacturers are seeking methods and systems that use renewable components such as bio-renewable polyols. In the past attempts have been made to combine bio-renewable polyols with petroleum-based polyols in the formation of polyurethane foams. These combinations have met with limited success since the addition of the bio-renewable polyols significantly affected the mechanical properties of the produced foams in a negative manner.

It is desirable to provide a polyurethane foam produced using only bio-renewable polyols that has mechanical and functional properties equal to or greater than those found in polyurethane foams produced from petroleum derived polyols.

SUMMARY OF THE DISCLOSURE

This section provides a general summary of the present disclosure and is not intended to be interpreted as a comprehensive disclosure of its full scope or all features, aspects and objectives.

One aspect of the present disclosure is to provide a polyurethane foam comprising the reaction products of at least one polyisocyanate pre-polymer and at least one polyol, wherein all polyols utilized in the foam are bio-renewable derived polyols having a bio-renewable content of at least 70% by weight and wherein said foam has a bio-renewable content by weight of at least 40% by weight.

In another aspect the polyurethane foam according to the present invention has a density of at least 3 pounds/cubic foot; a compression force deflection at 40% of at least 4.25 pounds/inch$^2$; a tensile strength of at least 60 pounds/inch$^2$; an elongation at break of at least 100%; and a tear strength of at least 10.5 pounds/inch$^2$.

In another aspect the present disclosure is a method A method of forming a polyurethane foam comprising the steps of: a) providing a polyisocyanate pre-polymer made from a bio-renewable polyol; b) providing a polyol, wherein said polyol is a bio-renewable polyol having a bio-renewable content of at least 70% by weight; and c) combining said polyisocyanate pre-polymer with said polyol in the absence of any petroleum derived polyols and forming the polyurethane foam.

These and other features and advantages of this disclosure will become more apparent to those skilled in the art from the detailed description herein. The drawings that accompany the detailed description are described below.

BRIEF DESCRIPTION OF THE DRAWINGS

The drawings described herein are for illustrative purposes only of selected aspects and not all implementations, and are not intended to limit the present disclosure to only that actually shown. With this in mind, various features and advantages of example aspects of the present disclosure will become apparent to one possessing ordinary skill in the art from the following written description and appended claims when considered in combination with the appended drawings, in which:

FIG. 1 is a FIGURE showing the heat flow versus temperature for a foam made from a bio-renewable polyol in accordance with the present invention and the heat flow versus temperature for a foam made from a petroleum based polyol not in accordance with the present invention to allow for determination of glass transition, Tg, temperature of the two foams.

DETAILED DESCRIPTION OF THE DISCLOSURE

In the following description, details are set forth to provide an understanding of the present disclosure.

For clarity purposes, example aspects are discussed herein to convey the scope of the disclosure to those skilled in the relevant art. Numerous specific details are set forth such as examples of specific components, devices, and methods, in order to provide a thorough understanding of various aspects of the present disclosure. It will be apparent to those skilled in the art that specific details need not be discussed herein, such as well-known processes, well-known device structures, and well-known technologies, as they are already well understood by those skilled in the art, and that example embodiments may be embodied in many different forms and that neither should be construed to limit the scope of the disclosure.

The terminology used herein is for the purpose of describing particular example aspects only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or feature is referred to as being "on," "engaged to," "connected to," "coupled to" "operably connected to" or "in operable communication with" another element or feature, it may be directly on, engaged, connected or coupled to the other element or layer, or intervening elements or features may be present. In contrast, when an element is referred to as being "directly on," "directly engaged to," "directly connected to," or "directly coupled to" another element or feature, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly and expressly indicated by the context. Thus, a first element, component, region, layer or section discussed below could be termed a second element, component, region, layer or section without departing from the teachings of the example embodiments.

For purposes of description herein, the terms "upper," "lower," "right," "left," "rear," "front," "vertical," "horizontal," and derivatives thereof shall relate to the invention as oriented in the FIGS. However, it is to be understood that the present disclosure may assume various alternative orientations and step sequences, except where expressly specified to the contrary. It is also to be understood that the specific devices and processes illustrated in the attached drawings, and described in the following specification are exemplary aspects of the inventive concepts defined in the appended claims. Hence, specific dimensions and other physical characteristics relating to the aspects disclosed herein are not to be considered as limiting, unless the claims expressly state otherwise.

The terms "bio-renewable derived" or "bio-renewable based" polyol means a polyol that is derived from or based on a source that is renewable. Examples include natural oils such as vegetable oils derived from plants and oils produced from other renewable resources such as bacterial sources. The terms "petroleum based" or "petroleum derived" polyol refers to a polyol that is derived from or based on a petroleum source or other non-renewable source. The term "polyol" means a polymer having at least two —OH groups or more in its structure. The term "polyisocyanate" means a structure have at least two isocyanate groups or more.

The present invention comprises replacing all of the petroleum based polyols in a polyurethane formulation with only bio-renewable based polyols. Typically these bio-renewable based polyols are produced from natural oils produced by plants such as vegetable oils; however it can comprise any bio-renewable source including a bacterial source. The initial source of the natural vegetable oil can comprise soybean, cotton seed, neema seed, canola, nut oils and castor oils. In one process, these plant based natural oils are then processed to separate the saturated oils from the unsaturated oils. The unsaturated oils are then subjected to either an ozone treatment or a dimer process to produce at least one or more dicarboxylic acids, also known as dimer acids, such as azelaic acid among others. Azelaic acid is a $C_9$, saturated dicarboxylic acid with the carboxyl groups on the terminal ends. The dimer acids are then combined with one or more components selected from glycerin, short chain glycols such as ethylene glycol, diols, higher functional alcohols and other diacids. The mixture is then subjected to esterification and the produced polyols are isolated. This process provides one source of bio-renewable polyols used in the present invention. Bio-renewable oils produced according to this method are available from Emery Oleochemicals and include polyols such as Emerox® XPS-094. Other methods of processing natural bio-renewable oil sources can be utilized to produce completely bio-renewable polyols. Most preferably, the bio-renewable polyols utilized in the present invention have the following characteristics. They are linear, diol polyester polyols formed from polymerization of ethylene glycol and azelate, a $C_9$ saturated dicarboxylic acid derived from vegetable oils. The preferred bio-renewable polyols have a bio-renewable content of at least 70% by weight, more preferably at least 74% by weight based on the weight of the polyol. The preferred bio-renewable polyols have a viscosity at 25° C. of 350 to 700 centipoise. They preferably have a molecular weight ranging from 450 to 650. One example of a bio-renewable polyol in accordance with the present invention is Emerox® XPS-094 available from Emory. FIG. 1 shows the heat flow versus temperature for the foam made from bio-renewable polyol Emerox® XPS-094 in accordance with the present invention the mid-point, Tg, is 19.67° C. The FIG. 1 also shows a heat flow versus temperature for a foam made from petroleum polyol, Diexter-G® 110-225 not in accordance with the present invention. It has a mid-point, Tg, of 6.42° C. As can be seen the foam made with the bio-renewable polyol has a much higher Tg than the petroleum based one. The preferred foams made with the bio-renewable polyol have a glass transition temperature Tg of 15 to 25° C.

The polyisocyanates finding use in the present invention are all known polyisocyanates useful in preparation of polyurethanes. These include aromatic polyisocyanates such as diphenylmethane diisocyanate (MDI), polymeric MDI, and toluene diisocyanate (TDI) or other polyisocyanates including polyisocyanate pre-polymers, hydrogenated MDI, and naphthalene diisocyanate. Typically, the polyisocyanate used comprises MDI, polymeric MDI or TDI. The TDI is often supplied as a mixture of the 2, 4 TDI and the 2, 6 TDI isomers, such as T-65 which is a mixture of 65% 2, 4 TDI with 35% 2, 6 TDI. Most preferably the polyisocyanate used in the present invention is a polyisocyanate pre-polymer. The present inventors have found that the use of a polyisocyanate pre-polymer allows one to increase the bio-renewable content of the foam to a very high level such that one can use exclusively bio-renewable polyol to make the foams. Without the use of a polyisocyanate pre-polymer formed from a polyisocyanate and a bio-renewable polyol one is not able to achieve high levels of bio-renewable polyol in the foam.

In a preferred process the polyisocyanate pre-polymer is made as follows. The bio-renewable polyol is combined with a polyisocyanate in a sufficient ratio to provide a polyisocyanate pre-polymer having a final % free NCO content of 15 to 20% as known to one of skill in the art. First, the pre-determined amount of polyisocyanate is placed in a sealed reaction vessel with overhead stirring and under a positive pressure of 5 pounds per square inch (psi) of nitrogen, which is maintained throughout the reaction. Then the selected bio-renewable polyol is fed into the reaction vessel at a variable rate sufficient to maintain the reaction temperature at a temperature of from 60 to 85° C. throughout the addition. As known to one of skill in the art this is an exothermic reaction. If required, the reaction vessel can be placed on a hot plate to help maintain the reaction temperature. Once the fed of the polyol is completed the vessel is maintained sealed under 5 psi of nitrogen for an additional 2 hours to allow the reaction to go to completion. The final % free NCO is determined in accordance with ASTM method D2572-19 and the viscosity is measured in centipoise using a Brookfield viscometer. The polyisocyanate pre-polymer can be store under positive nitrogen pressure in a sealed vessel until use. Preferably the bio-renewable polyisocyanate pre-polymer is used at a level of from 76-84% by weight based on the total weight of the reaction mixture while the bio-renewable polyol itself is used at a level of from 10 to 20% by weight in the foam formation reaction. Preferably, the polyisocyanate to polyol ratio in the preferred reaction process for forming the final foam is greater than 1:1, meaning having an excess of polyisocyanate. This is usually expressed as the index of the polyurethane reaction mixture as known to those of skill in the art. In some control examples provided below a petroleum based polyisocyanate pre-polymer was created as detailed above for the bio-renewable polyisocyanate pre-polymer with the only change being the polyol used.

The present system can also comprise additional components found in polyurethane foam systems including: water, catalysts, surfactants, chain extenders, crosslinking components and stabilizers. The typical catalysts for polyurethane foam systems include: tertiary amines such as 1, 4 diazabicyclo[2.2.2] octane (DABCO) or bis-(2-dimethylaminoethyl)ether; other amines such as dimethylcyclohexylamine (DMCHA) or dimethylethanolamine (DMEA); metallic catalysts such as dibutyltin dilaurate or bismuth octanoate; and ultraviolet light. Commonly used catalysts are any of the JeffCAT® ZF series of bis-(2-dimethylaminoethyl)ether catalysts from Huntsman Corporation or the KosMos® metal catalysts from Evonik. For example the catalyst JeffCAT® ZF-24, which is a mixture of 23% bis-(2-dimethylaminoethyl)ether in dipropylene glycol, and is an often used catalyst. The surfactants can include typical silicone type polyurethane additives. Stabilizers include the polyether polysiloxanes from Evonik or Huntsman Corporation. The formulations can also include crosslinkers and blowing agents which are well known in the art of polyurethane foams.

The important mechanical properties of the polyurethane foams according to the present invention include hardness, tensile strength, tear resistance, and elongation. In addition, for the cleaning applications of the present invention important secondary properties include the foams response to water temperature, hydrolytic stability, durability and an ability to be used with or without added soap to clean surfaces in a scratch free manner. Using polyols in accordance with the present invention, even at very high levels or as the only polyol, produces foams having similar values for these secondary properties compared to use of only petroleum based polyols. This is in contrast to the prior art bio-renewable polyols. Prior art polyols could only be used to supplement the petroleum-based polyols at low levels, for example 10% or less, or the properties were severely effected in a negative manner.

In TABLE 1 are presented two polyurethane foam formulations. The control formulation is a typical petroleum based polyol formulation that uses the petroleum based polyol Diexter-G® 1100-225, both in the form of the polyol itself and as the polyol used to form a polyisocyanate pre-polymer. The inventive formulation uses the same components, except the polyol used for formation of the polyisocyanate pre-polymer and as the polyol is a completely bio-renewable polyol Emerox® XPS-094 produced as described herein from ethylene glycol and azelate chemistry. The azelate is derived from bio-renewable plant based oil sources. The amount of the components are in terms of weight percentage based on the total weight of the mixture. Preferably foams according to the present invention utilize only bio-renewable polyester polyols. Preferably the amount of bio-renewable content in the produced foams is at least 40% by weight, more preferably at least 42% by weight based on the total foam weight.

TABLE 1

| Component | Control formulation | Inventive formulation |
|---|---|---|
| Diexter-G ® 1100-225 Polyol | 10-20 | 0.00 |
| Emerox ® XPS-094 | 0.00 | 10-20 |
| Crosslinker | 0.50-1.5 | 0.50-1.5 |
| Blowing agent | 1-2.5 | 1-2.5 |
| Surfactant | 1-2 | 1-2 |
| Cell stabilizer and regulator | 0.5-1.0 | 0.5-1.0 |
| Catalyst(s) | 0.2-2.0 | 0.2-2.0 |
| Polyisocyanate pre-polymer made with Diexter-G ® 1100-225 polyol | 76-84 | 0.00 |
| Polyisocyanate pre-polymer made with Emerox ® XPS-094 | 0.00 | 76-84 |
| Index | 90-115 | 90-115 |

The properties of the polyurethane foams produced from each formulation are provided below in TABLE 2. One sees that the inventive formulation using 100% bio-renewable polyol to make both the polyisocyanate pre-polymer and as the polyol excels in every physical property measured, with a slight reduction in airflow compared to the polyurethane foam prepared using the petroleum based polyol. These results demonstrate that the inventive composition has overcome the previously found drawbacks with using bio-renewable polyols, namely a reduction in the physical properties of the produced foam.

TABLE 2

| Measurement | Control Formulation | Inventive formulation |
| --- | --- | --- |
| Density (lb/ft³) | 3.30 | 3.39 |
| Airflow (ft³/min) | 0.24 | 0.19 |
| Compressive Force Deflection at 40% (lb/in²) | 3.78 | 4.33 |
| Tensile strength (lb/in²) | 54.49 | 61.16 |
| Elongation (%) at break | 212.03 | 255.13 |
| Tear strength (lb/in) | 11.63 | 12.99 |

In another example the control and inventive foams had the composition provided below in TABLE 3 and produced the physical property results seen in TABLE 4. The formulations have been modified in these examples by optimizing the blow gel catalyst package and the blowing agent level to reduce the foam density compared to the previous example. This example set contains a similar NCO with a lower index. Again the data shows that the foam produced using 100% bio-renewable content has similar or greater values for all of the measured parameters, further confirming the value of this invention.

TABLE 3

| Component | Control formulation | Inventive formulation |
| --- | --- | --- |
| Diexter-G ® 1100-225 polyol | 10-20 | 0.00 |
| Emerox ® XPS-094 | 0.00 | 10-20 |
| Crosslinker | 0.5-1.5 | 0.5-1.5 |
| Blowing agent | 1-2.5 | 1-2.5 |
| Surfactant | 1-2 | 1-2 |
| Catalysts | 0.2-2.0 | 0.2-2.0 |
| Cell stabilizer and regulator | 0.5-1.0 | 0.5-1.0 |
| Polyisocyanate pre-polymer made from Diexter-G ® 1100-225 polyol | 76-84 | 0.00 |
| Polyisocyanate pre-polymer made from Emerox ® XPS-094 polyol | 0.00 | 76-84 |
| Index | 90-115 | 90-115 |

TABLE 4

| Measurement | Control Formulation | Inventive formulation |
| --- | --- | --- |
| Density (lb/ft³) | 3.10 | 3.03 |
| Compressive Force Deflection at 40% (lb/in²) | 3.11 | 5.22 |
| Tensile strength (lb/in²) | 63.4 | 62.1 |
| Elongation (%) at break | 110 | 105 |
| Tear strength (lb/in) | 13.4 | 10.7 |
| Cell count, pores/in³ | 10-12 | 12-16 |
| Bio-renewable content % of total content | 2-4 | 40-45 |

The foams produced according to the inventive formula have the following durability property compared to the control formulation. To test durability the foams were each placed in a washing machine with a hockey ball and Dawn® detergent and run for 12 cycles, each cycle was run at a water temperature of 120-140° F. for 70 minutes. Then the foams were removed and measured for weight loss indicative of break down. Both the control and the inventive foams lost less than 3% of their initial weight indicating excellent durability and hydrolytic stability.

The present invention demonstrates that polyurethane foams having excellent mechanical and performance properties can be produced using bio-renewable polyols as the main polyol and in some cases as the only polyol. Preferably these foams are formed using polyisocyanate pre-polymers formed using exclusively bio-renewable polyols in combination with only bio-renewable polyols. This is in contrast to past attempts to use any significant amount of bio-renewable polyols alone which have resulted in foams having reduced mechanical or physical performance properties. Preferably the inventive formulations are used to form polyurethane foam sponges and other cleaning products for industrial and consumer cleaning applications.

The foregoing disclosure has been described in accordance with the relevant legal standards, thus the description is exemplary rather than limiting in nature. Variations and modifications to the disclosed embodiment may become apparent to those skilled in the art and do come within the scope of the disclosure. Accordingly, the scope of legal protection afforded this disclosure can only be determined by studying the following claims.

We claim:

1. A bio-renewable based polyurethane foam comprising the reaction products of at least one bio-renewable polyisocyanate pre-polymer and at least one bio-renewable polyol, wherein all polyols utilized in the foam are bio-renewable derived polyols having a bio-renewable content of at least 70% by weight, a viscosity at 25° C. of from 350 to 700 centipoise, and a molecular weight of from 450 to 650 g/mol and wherein said foam has a bio-renewable content of at least 40% by weight based on the total weight of the polyurethane foam and an elongation at break of at least 100%.

2. The bio-renewable based polyurethane foam as recited in claim 1 wherein said at least one bio-renewable polyisocyanate pre-polymer comprises the reaction product of at least one polyisocyanate and at least one bio-renewable polyol and has a final free NCO content of from 15 to 20% by weight.

3. The bio-renewable based polyurethane foam as recited in claim 2 wherein the at least one bio-renewable polyol used to form the at least one bio-renewable polyisocyanate pre-polymer comprises a linear, diol polyester polyol having a bio-renewable content of at least 70% by weight.

4. The bio-renewable based polyurethane foam as recited in claim 1 wherein said at least one bio-renewable polyol comprises a linear, diol polyester polyol having a bio-renewable content of at least 70% by weight.

5. The bio-renewable based polyurethane foam as recited in claim 1 wherein the foam has a density of at least 3 pounds per cubic foot.

6. The bio-renewable based polyurethane foam as recited in claim 1 wherein the foam has a compression force deflection at 40% of at least 4.25 pounds per square inch.

7. The bio-renewable based polyurethane foam as recited in claim 1 wherein the foam has a tensile strength of at least 60 pounds per square inch.

8. The bio-renewable based polyurethane foam as recited in claim 1 wherein the foam has a tear strength of at least 10.5 pounds per square inch.

9. The bio-renewable based polyurethane foam as recited in claim 1 wherein the at least one bio-renewable polyol comprises the reaction products of a polymerization reaction of ethylene glycol and azelate.

10. The bio-renewable based polyurethane foam as recited in claim 1 wherein the foam has a glass transition temperature of from 15 to 25° C.

11. A method of forming a bio-renewable based polyurethane foam comprising the steps of:
  a) providing a polyisocyanate pre-polymer formed from a bio-renewable polyol;
  b) providing one or more additional bio-renewable polyols, wherein all of said polyols utilized in said method are bio-renewable polyols having a bio-renewable content of at least 70% by weight, a viscosity at 25° C. of from 350 to 700 centipoise, and a molecular weight of from 450 to 650 g/mol; and
  c) combining said polyisocyanate pre-polymer with said one or more additional bio-renewable polyols in the absence of any petroleum derived polyols and forming the polyurethane foam, the polyurethane foam having an elongation at break of at least 100%.

12. The method as recited in claim 11 wherein in step a) said polyisocyanate pre-polymer is the reaction product of at least one polyisocyanate and at least one bio-renewable polyol and wherein the polyisocyanate pre-polymer has a final free NCO content of from 15 to 20% by weight.

13. The method as recited in claim 11 wherein said one or more additional bio-renewable polyols are linear diols.

14. The method as recited in claim 11 wherein step c) comprises forming a reaction mixture by combining 76 to 84% by weight of said polyisocyanate pre-polymer with 10 to 20% by weight of said one or more additional bio-renewable polyols in the absence of any petroleum derived polyols and forming the polyurethane foam, all based on the total weight of the reaction mixture.

15. The method as recited in claim 11 wherein step c) comprises combining the polyisocyanate pre-polymer and the one or more additional bio-renewable polyols at a ratio of isocyanate groups to hydroxyl groups of greater than 1:1.

* * * * *